3,338,889
PRODUCTION OF ω-LACTAMS

André Pesson, Tassin, France, assignor to Societe Rhodiaceta, Paris, France, a French body corporate
No Drawing. Filed Dec. 11, 1964, Ser. No. 417,783
Claims priority, application France, Dec. 20, 1963, 957,961; Jan. 9, 1964, 959,808
9 Claims. (Cl. 260—239.3)

This invention relates to the production of ω-lactams, and more particularly to ω-lactams having 6 to 12 carbon atoms in the ring.

The synthesis of ω-lactams by reaction of ammonia with ω-lactones has been known for many years.

One of the first publications on this subject concerns the preparation of α-pyrrolidone by reaction of anhydrous ammonia with γ-butyrolactone at elevated temperature. However, when it is attempted to apply this process to higher ω-lactones, it does not give sufficiently high yields for industrial operation, even if zinc chloride is used as catalyst, by-products of high molecular weight being formed in quantities which may be very considerable. For example, the heating of ε-caprolactone with anhydrous ammonia gives a polymeric product and substantially no monomeric ε-caprolactam.

It was later proposed, in order to increase the yield and to avoid the formation of by-products, to carry out the reaction of ω-lactone and ammonia in the presence of water and in the absence of catalysts at high temperature under pressure. While the object may be achieved in the case of ω-lactones having less than 6 carbon atoms in the ring, the conversion to lactam in the case of higher ω-lactones is still low.

In order to increase this conversion, it has been suggested to carry out the operation above the critical temperature and above the critical pressure of water. However, this gives rise to severe problems from the technological viewpoint, because an apparatus resisting pressures above 220 kg./cm.$^2$ must be used.

It is therefore an object of the present invention to provide a process for the preparation of ω-lactams having 6 to 12 carbon atoms in the ring from ω-lactones whose ring has the same number of carbon atoms in a relatively simple manner and in relatively high yield.

According to the invention a lactone having 6 to 12 carbon atoms in the ring is heated with an excess of ammonia in a liquid aqueous medium at a temperature of at least 275° C. under pressure in the presence as catalyst of a salt derived from a strong acid and a weak base.

For the purpose of the present specification, "strong acid" means an acid whose dissociation constant at 25° C. is higher than $1.70 \times 10^{-5}$, and "weak base" means a base whose dissociation constant at 25° C. is lower than $1.5 \times 10^{-5}$.

Suitable strong acids include hydriodic acid, hydrochloric acid and sulphuric acid. Of course, the anion of the acid must be stable at the reaction temperature, and this obviously excludes the use of, for example, the thiocyanate ion.

The weak base is preferably ammonia.

The salt used as catalyst may be added as such to the reaction medium, or it may be formed in situ by adding stoichiometric quantities of the acid and base from which it is derived, or of compounds which liberate the acid or base in the reaction medium.

In the case of an ammonium salt it is sufficient to add the acid, since the excess of ammonia in the reaction mixture provides the cation. However it is usually simpler to add the salt.

The proportion of catalyst in relation to the reaction mixture may vary between 1% and 10% by weight. Below 1%, the reaction speed is not substantially increased, while above 10%, it is not found that the catalytic action is affected significantly by the quantity of catalyst.

An excess of ammonia of the order of 3 to 20 times the theoretical quantity is preferably used. The ammonia is preferably in the form of an aqueous solution whose concentration may vary, but is preferably between 10% and 30% by weight.

During the reaction the temperature is maintained above 275° C., and generally above 300° C. At lower temperatures, despite the presence of the catalyst, the reaction speed is too slow to be compatible with industrial operation. In practice, the operation is preferably carried out between 300° and 350° C. The optimum temperature in any particular case depends upon the nature and proportions of the materials employed, and can readily be found by means of a preliminary test.

The operation requires a pressure above 90 kg./cm.$^2$, and usually autogenous pressure will be used.

The duration of the reaction may vary within fairly wide limits, and depends upon the nature and the proportions of the materials employed, as also upon the temperature, being shorter at higher temperatures, all other factors being equal. As previously stated, however, there is generally no advantage in exceeding 350° C.

When the desired degree of conversion into lactam has been reached, the ω-lactam formed can be isolated by extracting it from the aqueous liquid by means of a solvent such as benzene, chloroform, etc., and then distilling off the solvent.

Particularly high yields may be obtained by reacting the ω-lactone with an excess of aqueous ammonia and extracting the lactam formed as above described, and then re-using the solution which remains after extraction of the lactam formed, which contains ammonia and secondary reaction products, after adding to it further lactone and ammonia in amounts corresponding to the quantities of lactam extracted, and heating the whole to a temperature above 275° C. under autogenous pressure, separating the ω-lactam thus formed, repeating this recycling operation, e.g. for as long as satisfactory results are obtained.

These operations may be carried out semi-continuously or continuously.

The following examples illustrate the invention without limiting it ("parts" are by weight).

Example I

Into a stirred 1 litre autoclave are introduced 40 g. of ε-caprolactone and 400 g. of 15% ammonia. The mixture is heated to 330° C. in 2 hours under autogenous pressure and then maintained at this temperature for 30 minutes.

The mixture is then suddenly cooled and the reaction products are extracted with chloroform. The chloroform is distilled off, after which the ε-caprolactam formed is distilled under reduced pressure.

There is recovered 8.8 g. of ε-caprolactam, the yield thus being 22.2%.

The operation is repeated with a catalyst in accordance with the invention, by introducing into the autoclave 40 g. of ε-caprolactone, 400 g. of 15% ammonia and 27.10 g. of ammonium iodide.

The same procedure is then followed as in the previous case and 16.4 g. of ε-caprolactam are collected, being a yield (on the ω-lactone employed) of 41.4%.

Example II

There are introduced into each of four stirred 1 litre autoclaves 40 g. of ε-caprolactone, 400 g. of 15% ammonia and 10 g. of ammonium chloride.

Each mixture is heated to 330° C. under autogenous pressure, this temperature being reached in 2 hours and then held for a predetermined period, different in each experiment; the reaction is then interrupted by sudden cooling.

The yields of ε-caprolactam isolated are:

Heating time at constant
temperature (330° C.): Yield, percent
½ hour _____ 34
1 hour _____ 43.2
1½ hours _____ 49.1
2 hours _____ 52.1

Example III

There are introduced into each of four stirred 1 litre autoclaves 40 g. of ε-caprolactone, 400 g. of 10% ammonia and 10 g. of ammonium chloride.

The contents of each of these autoclaves are heated to different temperatures under autogenous pressure.

The ε-caprolactam is isolated after reaction for 7 hours. The yields are:

Reaction temperature: Yield, percent
246° C. _____ 8.3
282° C. _____ 40.3
300° C. _____ 47.5
305° C. _____ 49.9

It will be seen that the reaction speed is very low at 246° C., but that at 282° C. the reaction proceeds at a reasonable speed.

Example IV

Five stirred 1 litre autoclaves are charged with 40 g. of ε-caprolactone and 400 g. of 15% ammonia, whereafter a different weight of catalyst (ammonium chloride) is introduced into each.

The five autoclaves are heated to 330° C. under the same conditions and the reaction is allowed to proceed for 30 minutes, whereafter the ε-caprolactam formed is isolated. The yields are:

| Weight of catalyst, g. | Percentage on reaction medium | Yield, percent |
|---|---|---|
| 0 | 0 | 22 |
| 5 | 1.1 | 29.8 |
| 10 | 2.2 | 34 |
| 20 | 4.3 | 38.3 |
| 27.1 | 5.7 | 39.4 |

Example V

Seven autoclaves each containing 465 cc. of a mixture consisting of 40 g. of ε-caprolactone and 400 g. of 15% ammonia, six of them containing also an ammonium salt as catalyst, are heated under the same conditions at 350° C. for 30 minutes.

When the lactam has been isolated, the following results are obtained:

| Catalyst | Quantity of catalyst employed in mole/litre | Yield, percent |
|---|---|---|
| None | 0 | 22 |
| Acetate | 0.4 | 22.7 |
| Phosphate | 0.13 | 26.5 |
| Sulphate | 0.2 | 30.8 |
| Chloride | 0.4 | 34 |
| Bromide | 0.4 | 37.6 |
| Iodide | 0.4 | 41.4 |

Example VI

Into a stirred 1 litre autoclave are introduced:

40 g. of ε-caprolactone, 400 g. of 15% aqueous ammonia and 10 g. of ammonium chloride.

The mixture is heated to 315° C. under autogenous pressure, and this temperature is maintained for 3 hours. The mixture is then suddenly cooled and the caprolactam formed is extracted with chloroform. Distillation of the chloroform layer yields 19.8 g. of caprolactam.

The aqueous solution remaining after the extraction with chloroform is recharged into the autoclave, and there are added therto 20 g. of ε-caprolactone and 3 g. of ammonia, whereafter the mixture is heated as before at 315° C. under autogenous pressure for 3 hours. The reaction is stopped and the lactam formed is extracted as before. 21.5 g. of crude lactam is recovered, yielding on distillation 18.8 g. of pure ε-caprolactam, i.e. the yield in relation to the lactone introduced is 94.9%.

Example VII

Into a stirred 1 litre autoclave are charged:

40 g. of ε-caprolactone, 400 g. of aqueous 15% ammonia and 10 g. of ammonium chloride.

This mixture is heated under autogenous pressure at 330° C. for 1½ hours. After interruption of the reaction, extraction with chloroform and distillation as in Example I, there is isolated 19.7 g. of pure ε-caprolactam (corresponding to a yield of 49.4% of lactam).

The residual aqueous solution is recharged into the autoclave with 20 g. of ε-caprolactone and 3 g. of ammonia, whereafter the mixture is heated at 330° C. as before for 1½ hours, and the caprolactam formed is isolated.

This cycle of operations comprising re-use of residual solutions is repeated a number of times. The results obtained from these successive recyclings are the following:

| Recycling | Lactone employed, g. | Crude lactam, g. | Pure lactam after distillation, g. | Yield (X), percent |
|---|---|---|---|---|
| 1 | 20 | 21.9 | 19.2 | 95.9 |
| 2 | 20 | 20.8 | 18.5 | 92.4 |
| 3 | 20 | 20.2 | 18.1 | 90.4 |
| 4 | 20 | 19.7 | 17.5 | 87.4 |
| 5 | 20 | 20.2 | 18.0 | 89.7 |
| 6 | 20 | 20.2 | 18.0 | 89.7 |
| 7 | 20 | 21.9 | 19.2 | 95.4 |

(X) Distilled lactam yield calculated on the recharged lactone.

I claim:
1. Process for the production of ω-lactams having 6 to 12 carbon atoms in the ring, which comprises heating the corresponding ω-lactones with an excess of ammonia in a liquid aqueous medium at a temperature above 275° C. under pressure in the presence as catalyst of a salt derived from a strong acid and a weak base.

2. Process according to claim 1, wherein the catalyst is an ammonium salt.

3. Process according to claim 2, wherein the catalyst is ammonium chloride.

4. Process according to claim 1, wherein the lactone and ammonia are heated to a temperature of 300°–350° C.

5. Process according to claim 1, wherein ε-caprolactone is heated with ammonia and ε-caprolactam is formed.

6. Process for the production of ε-caprolactam, which comprises heating ε-caprolactone with 3–20 times the stoichiometric equivalent of ammonia in the form of an aqueous solution of concentration 10–30% by weight at a temperature of 300°–350° C. under the autogenous pressure in the presence as catalyst of 1–10%, on the weight of the reaction mixture, of an ammonium salt of an acid of dissociation constant at 25° C. above $1.70 \times 10^{-5}$.

7. Process according to claim 6, wherein the catalyst is ammonium chloride.

8. Process according to claim 1, wherein at least part of the lactam formed is extracted from the resulting aqueous liquid with an organic solvent, the aqueous residue, after addition of further ω-lactone and ammonia, is again heated under the said conditions, and lactam extracted from the resulting aqueous liquid, the cycle being repeated a number of times such that the conversion of lactone to lactam remains satisfactory.

9. Process according to claim 6, wherein at least part of the lactam formed is extracted from the resulting aqueous liquid with an organic colvent, the aqueous residue, after addition of further ω-lactone and ammonia, is again heated under the said conditions, and lactam extracted from the resulting aqueous liquid, the cycle being repeated a number of times such that the conversion of lactone to lactam remains satisfactory.

References Cited

UNITED STATES PATENTS

| | | | |
|---|---|---|---|
| 2,817,646 | 12/1957 | Payne | 260—339.3 |
| 3,000,878 | 9/1961 | Phillips et al. | 260—239.3 |
| 3,000,880 | 9/1961 | Phillips et al. | 260—239.3 |

WALTER A. MODANCE, *Primary Examiner.*

ROBERT T. BOND, *Assistant Examiner.*